(12) United States Patent
Hofmann

(10) Patent No.: US 7,861,830 B2
(45) Date of Patent: Jan. 4, 2011

(54) SAFETY DEVICE

(76) Inventor: Klaus Hofmann, Birkenweg 10, D-85567 Bruck (DE)

( * ) Notice: Subject to any disclaimer, the term of this patent is extended or adjusted under 35 U.S.C. 154(b) by 877 days.

(21) Appl. No.: 10/598,528

(22) PCT Filed: Mar. 3, 2005

(86) PCT No.: PCT/DE2005/000388

§ 371 (c)(1),
(2), (4) Date: May 21, 2007

(87) PCT Pub. No.: WO2005/085653

PCT Pub. Date: Sep. 15, 2005

(65) Prior Publication Data

US 2008/0000346 A1 Jan. 3, 2008

(30) Foreign Application Priority Data

Mar. 3, 2004 (DE) .................. 10 2004 010 987

(51) Int. Cl.
*B65H 59/10* (2006.01)
(52) U.S. Cl. .................. 188/67; 188/151 R; 188/170; 279/4.01; 279/4.03; 279/2.06; 279/2.08; 92/89; 92/92
(58) Field of Classification Search .................. 188/67, 188/43, 170, 151 A, 151 R; 279/2.06–2.09, 279/4.01, 4.03–4.05; 403/5, 31; 92/8, 24, 92/27, 89–92; 166/84.4, 84.1; 251/1.2
See application file for complete search history.

(56) References Cited

U.S. PATENT DOCUMENTS 3,626,506 A * 12/1971 Spieth .................. 403/31
3,663,027 A * 5/1972 Klipping .................. 279/4.03
3,869,002 A * 3/1975 Koenig, III .................. 173/166

(Continued)

FOREIGN PATENT DOCUMENTS

DE 1893364 5/1964

(Continued)

OTHER PUBLICATIONS

Search Report for German App. No. 10 2004 010 987.7, dated Aug. 4, 2004 (6 pages), Munich, Germany.

(Continued)

*Primary Examiner*—Robert A Siconolfi
*Assistant Examiner*—Mariano Sy
(74) *Attorney, Agent, or Firm*—The Culbertson Group, P.C.

(57) ABSTRACT

A safety device is provided having a clamping system that uses pressure admission into a chamber of a clamp element dependent on the position of a weight to be carried relative to the clamping system. For this purpose a valve is provided in a medium supply line, which valve is to be opened or closed by means of a movable actuation element. Here, the actuation element should be movable in the same direction in which the weight moves, preferably in a vertical direction. As a result of the arrangement of such a valve, the device couples the vertical movement or position of the weight with an actuation of the valve, and thus to provide an additional control for the pressure admission into the chamber or the clamping force resulting therefrom. A preferred chamber has curved top and bottom walls that elongate with a pressure drop.

20 Claims, 6 Drawing Sheets

U.S. PATENT DOCUMENTS

| | | | |
|---|---|---|---|
| 3,995,534 A | 12/1976 | Rastetter et al. | |
| 4,264,229 A * | 4/1981 | Falk et al. | 403/5 |
| 4,428,737 A * | 1/1984 | Schwenzfeier et al. | 464/28 |
| 5,855,446 A * | 1/1999 | Disborg | 403/31 |
| 6,182,977 B1 * | 2/2001 | Weller | 279/2.08 |
| 6,488,323 B1 * | 12/2002 | Bouligny | 294/119.3 |
| 6,629,584 B1 * | 10/2003 | Muller | 188/43 |
| 7,108,108 B1 * | 9/2006 | Heinzeroth | 188/67 |

FOREIGN PATENT DOCUMENTS

| | | | |
|---|---|---|---|
| DE | 1188401 A | | 3/1965 |
| DE | 4430535 A1 | * | 2/1996 |
| DE | 29621358 | | 3/1997 |
| DE | 29907633 | | 11/1999 |
| DE | 20002915 | | 8/2000 |
| DE | 20306924 | | 8/2003 |
| GB | 1520659 A | | 8/1978 |
| GB | 2101197 A | | 1/1983 |
| JP | 63009737 A | * | 1/1988 |

OTHER PUBLICATIONS

English translation of Japanese Office Action dated Aug. 24, 2010 issued in Japanese patent application No. 2007-501112 (10 pages).

* cited by examiner

SAFETY DEVICE

TECHNICAL FIELD OF THE INVENTION

The present invention relates to a safety device for detachable clamping of elements that move relative to each other.

BACKGROUND OF THE INVENTION

In machine construction, for example, in an assembly installation, linear guidance systems are known that work in the vertical direction. In the process, the components to be moved, which may be very heavy, are moved up and down preferably in the vertical direction. To secure the moved loads, for example, in the case of a system failure with pressurized air stoppage or electrical power outage, clamping systems are known in practice that are capable of clamping the load to be carried in a substantially arbitrary vertical position relative to a guide, so that the load is not lowered or does not fall due to gravity.

In particular, clamping systems are known in which a clamp element is provided with a chamber into which a medium can be admitted, which chamber, during the admission, undergoes changes in its geometric dimensions such that, as a result, a force is applied or released against a stationary component relative to the moved load, to allow a clamping or release of the relative movement between the load and the component. This stationary component can be particularly the vertical guide. Usually pressurized air or hydraulic oil is admitted into the chamber.

In particular, there is a known design of a clamping system that, in the pressureless state (when there is no pressure in it), generates a clamping force, which design as a result of the pressure admission caused by a corresponding deformation of the chamber releases the clamping force and allows the relative movement between the weight-bearing part and the fixed component. This system presents the advantage that in the case of a stoppage of the pressurized air or the corresponding hydraulic medium, the clamping force is applied, and the relative movement is stopped, preventing further movement of the weight in the case of a system failure.

However, the disadvantage of the designs known from the state of the art is that, following a failure as described above, the connection of the corresponding medium results in the clamping force being released again, and the weight being again set in motion as a result of gravity. This can cause considerable harm, both to equipment and to humans, if the connection of the medium occurs without sufficient consideration or safety provisions for the possible subsequent movement of the weight. The safety mechanism thus works only to the extent that a failure of the system pressure stops a relative movement. The consequences of reestablishing the system pressure are the responsibility of only the operating personnel and are thus associated with risk.

The problem of the invention therefore is to provide a safety device that allows a reliable new startup of the above-mentioned installations, and that has a construction that is simple and cost-effective to carry out.

SUMMARY OF THE INVENTION

Provided is a safety device with a clamping system that uses pressure admission into a chamber of a clamp element dependent on the position of the weight to be carried relative to the clamping system by using an appropriate construction design. For this purpose, a valve is provided in a medium supply line, which valve is to be opened or closed by means of a movable actuation element. Here, the actuation element should be movable in the same direction in which the weight to be moved moves, that is, preferably in a vertical direction Z.

As a result of the arrangement of such a valve, it becomes possible to couple the vertical movement or position of the weight with an actuation of the valve, and thus to provide an additional control for the pressure admission into the chamber or the clamping force resulting therefrom.

Below, the term "opening" of the valve denotes a movement of the actuation element such that the supply into the chamber of the clamp element undergoes a pressure release, thus preventing a pressure buildup in the chamber. Conversely, the term "closing" below means that the medium fed into the system cannot escape, and thus pressure is admitted with force into the chamber of the clamp element.

In the simplest embodiment of the invention, a base body is provided, which can be traversed by a component extending in an axial direction in such a manner that the base body and the component represent two elements that are moved relative to each other. According to the state of the art, the component is considered here to be a fixed component, for example, in the shape of a vertically-oriented rod as a guide element. The base body slides up and down along this component.

The base body presents at least one clamp element, which contains a chamber into which a medium can be admitted through a medium supply. On or to the chamber, a force transmission element is coupled, which is designed for transmitting a clamping force from the chamber to the component. The component, which is preferably arranged vertically, receives the force in the radial direction, that is, substantially in the horizontal direction if the component is oriented vertically.

The term "radial" below refers to a direction toward the component. It is preferred for this direction to extend precisely perpendicularly with respect to a longitudinal direction of the component; however, other angles between the longitudinal axis of the component and the "radial" direction besides 90° are also included. The longitudinal axis of the component in this connection describes the direction of movement of the base body or of the clamp element relative to the component in the unclamped state.

It is also conceivable here for the longitudinal axis of the component to be curved, that is, to use a guide that is not necessarily shaped exclusively rectilinearly, for example, in the case of a component in the shape of a curved, or even circular, rail.

Because the cross section of the component perpendicular with respect to its axis can be not only circular, but also, for example, rectangular or in any desired other profile shape of a guide element, the expression "radial" therefore denotes not only a circular element. Rather, "radial" also describes the circumstance where a clamping force can be applied from several sides onto components that are arranged centrally with respect to it.

The clamp element, during the admission of medium into the chamber, is deformed elastically and thus undergoes a change in its dimensions. In particular, the dimension in the radial direction changes, so that, as a result, the component receives a force or force is removed from it via the force transmission element, in the radial direction relative to the base body, and consequently it is clamped or released.

Some embodiments also allow a permanent clamping (or also release) independent of whether the system pressure is built up again after a system breakdown.

In an advantageous embodiment of the invention, the actuation element is arranged on a weight body, or on a part thereof, which weight body is guided in the Z direction. By means of this simplification of the construction, a direct connection is established between the vertical position of the weight and the opening or closing of the valve. Thus, a movement of the weight in the Z direction opens or closes the valve. By an appropriate selection of the clamp elements (for example, such that a clamping force is applied when the chambers have no pressure), one can advantageously achieve that a clamping force is never applied if the weight body has opened the valve as a result of its movement and thus released the pressure from the medium supply line so that it is pressureless.

If the base body with a clamping system formed therein is coupled with the weight to be transported in an appropriate manner, then it receives the force of the weight. For this purpose, the base body can be arranged, for example, adjacent to and above the weight body to be transported.

The valve, which can be formed particularly in the base body itself, resides in a closed position or condition during the operation by the closely abutting weight body, so that pressure is applied to the clamping system and the clamping system allows a relative movement between the base body with the attached weight body, on the one hand, and the guide component fixed relative to the weight body, on the other hand.

A pressure drop in the system then results in a pressure release from the originally pressurized chamber in the clamping system, and consequently a clamping force is generated that should prevent additional movement of the base body together with the attached weight body. While the base body with the clamping system located therein is retained in its vertical position at the time the clamping force is generated, the weight body attached to the base body continues to be subjected to the gravitational force and thus separates from the base body located above it. As a result, the valve of the medium supply, which is already no longer under pressure, is opened (that is, moved to the open position or condition).

An additional downward movement of the weight body relative to the base body should be prevented by the above-mentioned coupling. It is conceivable here to use a simple guide rod system, which, while allowing the movement by shifting of the weight body to a selectable extent relative to the base body, maintains the weight body in the vertical or Z direction at a predetermined separation from the base body by means of appropriate coupling to this base body.

After system failure, the base body with the blocking clamping system is thus in a given vertical position, while the weight body is suspended, and also motionless, with a separation, which is preferably chosen to be small, under the base body. The separation between the base body and the weight body is advantageously chosen in such a manner that it ensures a sufficient opening of the valve, which occurs for a separation of a few millimeters.

If the system pressure is then built up again, then the medium supply indeed admits the corresponding medium; however, because the valve in the base body is opened as a result of the weight body no longer abutting, the chamber of the clamp element in the base body can no longer be pressurized and therefore cannot release the clamping. Any shifting or an unintended lowering of the base body together with the weight body is thus for the time being ruled out.

The clamping of the base body, even after the system pressure has been reestablished, can only be released if the weight body is moved upward again against the base body in such a manner that the valve is closed and thus the pressure in the clamping system is built up again. For example, if the weight body is driven or moved by means of an axle that is parallel to the Z direction (for example, by means of a lifting unit or a lifting system), and the fixed component functions only as a guide or safety element, then it is necessarily ensured that the weight body (together with the base body and the clamping system arranged above it) becomes freely movable again only when the axle or lifting unit arranged parallel to the weight body and belonging to the same pressure system works again as intended and can lift and carry the weight body.

In another embodiment of the invention, the coupling between the base body and the weight body is provided such that the weight body is pressed by a spring force in the Z direction against the base body. Such a spring force ensures that, when the clamping system is released, no relative movement occurs between the base body and the weight body. Rather, these two bodies are in principle applied against each other, so that the valve is closed and the pressure admission into the chamber in the clamping system is ensured. The spring force here should be chosen such that in the case of a pressure drop and the resulting clamping of the base body, the weight force of the weight body exceeds the spring force to such an extent that the weight body separates in the vertical direction downward away from the base body, thus opening the valve.

In an additional advantageous embodiment, the valve is designed such that, in the opened position, it allows the medium to flow from the medium supply line into the environment. This is particularly advantageous when compressed air is admitted because the construction costs are then very low. By simply opening the supply line to the environment during the opening of the valve, the pressure in the supply line and thus also in the chamber of the clamping system is released.

In a similar embodiment, on the other hand, the valve is designed so that the medium is recycled in a medium recycling line provided particularly for that purpose, when the valve is opened. This can be required particularly if the chamber of the clamping system is operated with hydraulic oil or a similar fluid. Because the hydraulic oil cannot be released into the environment, recycling of the hydraulic oil through an appropriate line is made possible. Again, it is essential for the functioning of this valve that the valve, in the opened state, prevent the pressurization of the chamber of the clamping system, so that the pressure in the chamber is released, thus allowing a clamping effect to be built up.

An additional advantageous embodiment of the invention provides for one or more clamp elements to be designed so that they surround the substantially fixed component (rod, guide) in the form of an annular membrane. Such a membrane, which can be designed particularly to be relatively flat, is constructed to generate high radial forces with, relative to them, a small change in the dimensions in the Z direction. The forces here are determined substantially on the basis of a rhombus, where the near and opposite tips are exposed to opposite forces, so that the result is a higher force at the other opposite tips that are farther from each other, using a small setting path.

The clamp element and/or the chamber can consist of any appropriate material, where it is advantageous for the chamber walls to be constructed so that they are resistant to tension or pressure, to be able to transmit a particularly strong force. In particular, they may be made entirely or partially of metal.

Instead of designing the component or rod, respectively, as a preferably fixed element, an additional advantageous embodiment of the invention provides for designing the component or rod as a movable element, which is intended to be moved in space (preferably up and down). On the other hand, the actuation element described above as substantially movable, should now be a fixed, or part of a fixed, component. The described base body with the clamping system formed therein here acts again in the above-described manner together with the actuation element, which is arranged in a fixed manner, or within a fixed component. By such an arrangement, the described principle continues to be applied; however, in spite of the replacement of the formerly fixed rod with a now moved component, and the replacement of the substantially co-moved actuation element with a now substantially fixed actuation element, the collaborative functioning of these components is maintained.

In a simple embodiment according to this principle, the base body which at least one clamp element thus, as before, acts in the above-described manner together with the component that traverses this base body in the axial direction, where, in this embodiment, the component (rod or similar part) performs the vertical movement proper, while the base body if need be experiences a slight deflection, as shown below. The supply of medium for the clamp element is also carried out in accordance with the above-mentioned embodiments through the base body, where again a valve formed between the base body and the actuation element can also influence the supply or reduce the supply pressure. However, in this process, the actuation does not occur due to the movement of the (now substantially fixed) actuation element, but due to the movement of the base body, which is arranged immediately below this fixed component, relative to the actuation element.

The base body here can be shifted to a desirable extent relative to the fixed component in the axial direction, so that according to the principle that is the foundation of the invention, the supply of medium to the base body undergoes a pressure reduction, and thus becomes without effect, if the base body is separated from the fixed component to an extent, thus opening a slit through which the medium can escape.

Alternatively, a medium supply is also conceivable through the fixed component into the base body, which is interrupted by opening the valve (formation of a slit between the fixed component and the base body). The following is a brief explanation of the operating principle:

During normal operation, the connection of the medium supply to the base body from below is applied directly against the fixed component, through which the medium supply is made available. The clamp element(s) is (are) preferably pressurized, so that no clamping effect is built up against the rod, guide, etc., which is moved axially with respect to the base body. Thus, the rod is freely movable in the axial direction, so that weights attached to or arranged on it can be co-moved up or down.

In the case of a pressure stoppage, the pressure of at least one clamp element is reduced so that a clamping force is generated between the base body and the vertically moved rod. The rod, optionally with weights arranged on it, is then pulled down by gravity, where the base body that is firmly clamped to the rod now also undergoes this movement.

However, an abutment provided between the component, which is fixed and functions as actuation element, and the base body catches the base body and the rod clamped to it in such a manner that the rod cannot be moved farther down over the abutment. Thus, the rod is reliably protected from an uncontrolled and possibly dangerous lowering.

In the case of a new startup of operation and the buildup of pressure in the medium supply, this pressure can at first not be transmitted up to the clamp element of the base body, because, as a result of the lowering of the base body with the rod, a slit has formed between the fixed component and the base body, which releases the introduced medium into the environment and which does not reach the base body. The rod thus remains stopped, in spite of the new availability of medium, in its downward position. (The same effect naturally also occurs according to the invention if—as described above—the medium supply reaches directly into the base body and presents only one opening in the direction of the fixed component arranged above it.)

However, if the rod (together with the base body clamped to it) is lifted in a targeted or intentional manner, so that the slit between the base body and the fixed component is closed, then the medium penetrates into the clamp element(s). As a result, the base body is separated from the vertically moved rod so that the latter can later be moved up and down in a targeted manner.

To ensure that the base body maintains its (abutting) position relative to the fixed component acting as the actuation element, an appropriate spring mechanism can be provided, which presses the base body with sufficient spring force from below against the fixed component, thus ensuring the supply of medium, or the maintenance of the medium pressure, into the clamp elements. It is advantageous to design the spring mechanism here in such a manner that the base body moves downward away from the fixed component only if an additional force (particularly the gravitation force of the rod in the case of the clamped state) also acts on the base body, pulling it down.

The above-described device can be used particularly in the case where the vertical component is to be moved, while the remaining components (base body or fixed component functioning as actuation element) should be substantially or completely fixed in space. All the dependent characteristics, such as the constitution of the base body or the shape and position of the rod, are here intended to be valid for all embodiments of the present invention.

In particular, for this reversal of function, it is conceivable to design an actuation element that does not release the medium freely into the environment, but into a selected medium recycling line, as would be required particularly for hydraulic oil. In this case, the actuation element would be attached in the fixed component in such a manner that, as a result of a downward movement of the base body, it opens an outlet for the medium to flow into the medium recycling line. If the base body moves in the above-described manner repeatedly upward to the desired extent, then the actuation element closes off the path into the medium recycling line, so that the pressure made available by the medium supply can again act on the clamp elements to release the clamping.

Additional advantageous embodiments are within the scope of the disclosure herein.

DETAILED DESCRIPTION OF PREFERRED EMBODIMENTS

Figure 1:
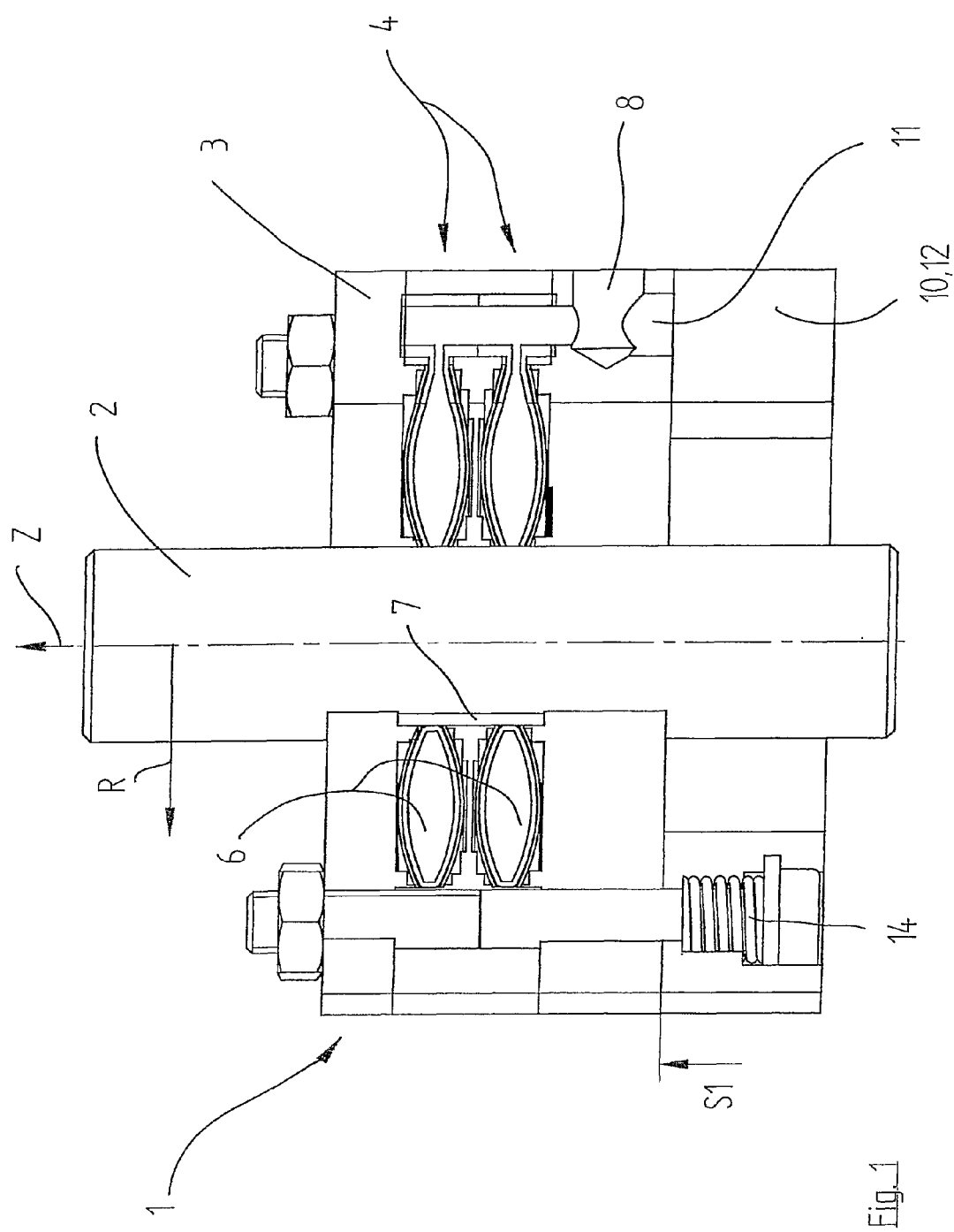
FIG. 1 shows a cross sectional view of a first embodiment of the invention in a position with a closed valve.

As can be seen in FIG. 1, a safety device 1 is provided. The safety device 1 surrounds a component 2 that, in the figures, is located substantially in the center of the image and arranged vertically. The component 2 is designed as a fixed guide in the form of a rod along which a base body 3 can slide up and down in a vertical direction Z.

A weight body 12 is mounted below the base body 3 by means of a screw system and a spring element 14 so that the weight body 12 is pressed in a detachable manner against the bottom side of the base body 3. Together with the base body 3, the weight body 12 is driven in an up and down movement by means of a lifting device that is not shown.

Inside the base body 3, two clamping systems 4, arranged one above the other, are provided. Each clamping system 4 presents, among other features, at least one elastically deformable chamber 6. In the case of elastic deformation of the chamber 6, its dimension in the radial direction changes so that a force transmission element 7 is moved in the direction toward the component 2 or away from the latter. Depending on the embodiment type of clamping system 4, and particularly as a function of the stiffness of the chambers 6 and the manufacturing tolerances, a slight shape change in the Z direction results in large forces in the radial direction, which can act via the force transmission element 7 on the component 2 to prevent a relative movement between the base body 3 and the component 2 by clamping.

The chambers 6 of the clamping system 4 receive, via a medium supply 8, an appropriate fluid, which may be pressurized air or also hydraulic oil or another fluid.

In the area of the medium supply 8 that runs inside the base body 3, a valve 11 is provided, which can be actuated by means of an actuation element 10 that is movable in the Z direction. In the example of FIG. 1, the actuation element 10 is constructed as part of the weight body 12. The actuation element 10 closes the medium supply 8 so that the medium can enter only into the chambers 6 of the clamping system 4, where it can build up an appropriate pressure.

The represented arrangement of the base body with the weight body 12 (position S1) applied directly against the base body, thus shows the valve 11 in the closed state.

Figure 2:
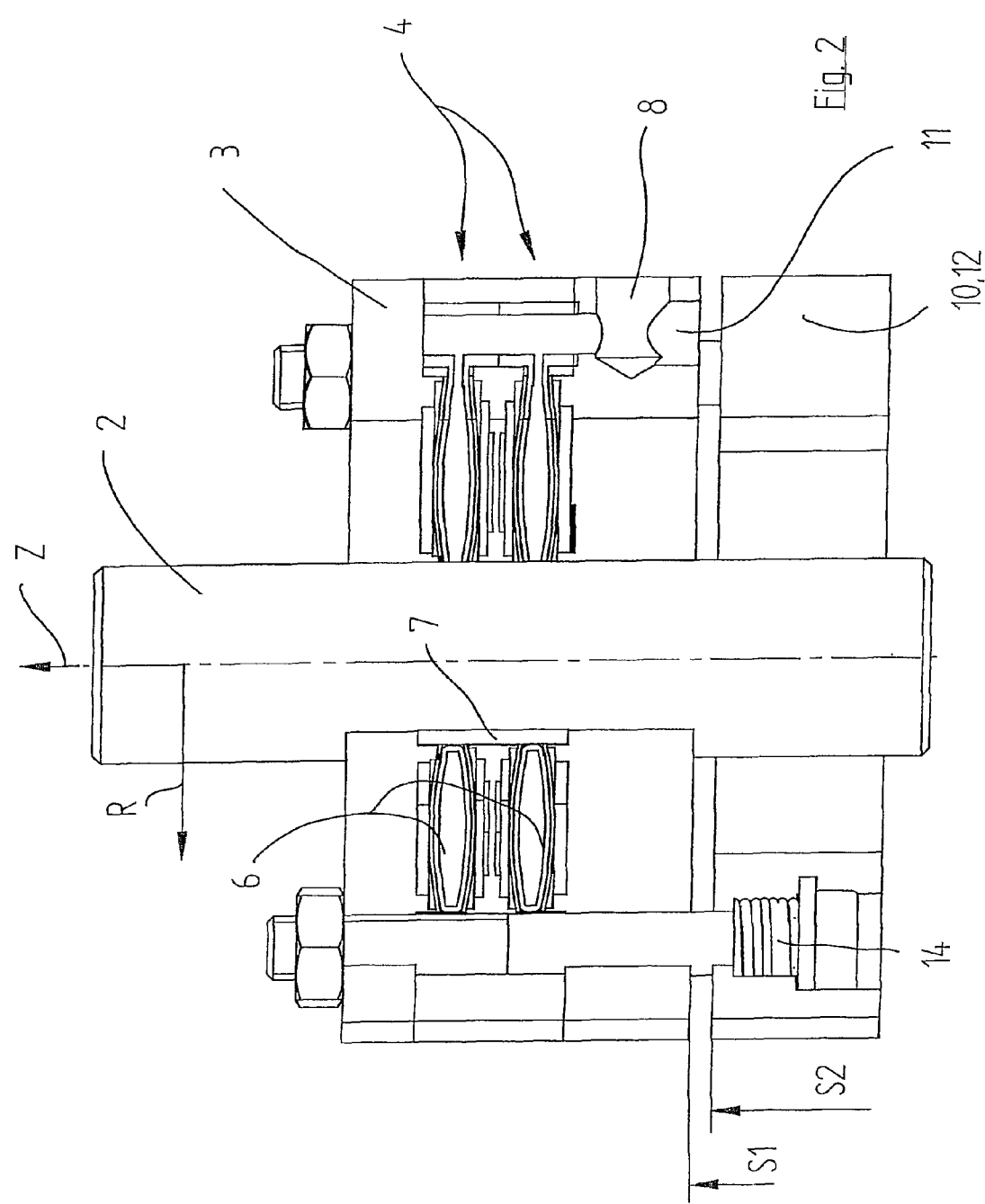
FIG. 2 shows the same embodiment as in FIG. 1 in a position with an opened valve.

In FIG. 2, the same arrangement can be seen after a breakdown in the pressure supply of the installation. As a result of the pressure drop, the chambers undergo pressure reduction and are flattened, which results in a radial clamping force directed inward against the components 2. In this state, the base body 3 is clamped against the component 2, and it can no longer be shifted in the Z direction relative to this component 2.

The weight body 12 suspended from the base body 3 has dropped against the force of the spring 14 to the degree allowed by the construction, and it is maintained in this position by screwing to the base body 3. It is shifted in a position S2, and thus it releases the opening of the valve 11. As a result, no medium can be compressed in the chambers 6.

Figure 3:
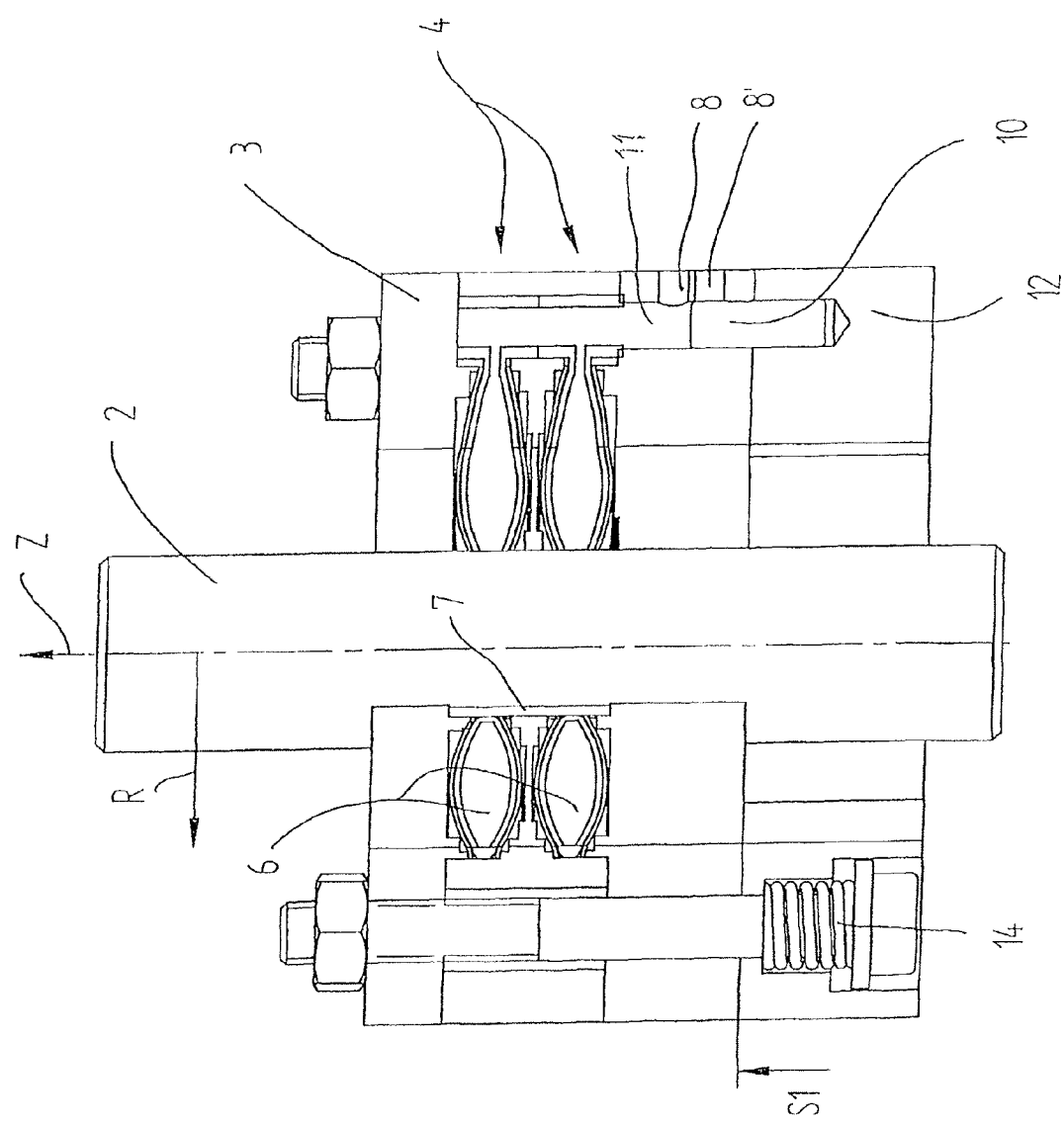
FIG. 3 shows a cross sectional view of an additional embodiment of the invention in a position with a closed valve.

Regardless of whether pressure is applied to the medium supply 8 or not (system failure or regular operation), the clamping effect now cannot be neutralized, because the medium escapes through the opened valve 11. It is only when pressurized medium is made available and there is an additional lifting of the weight body 12 to the lower abutment against the base body 3 that the valve 11 is closed again, so that pressure is applied to the chambers 6 and in the process the clamping force against the components 2 can be reduced or entirely eliminated. According to the invention, this can occur only if the lifting device—not shown—for the weight body and the base body works as intended and consequently an uncontrolled lowering or downfall of the weight body 12 is ruled out. In FIG. 3, a modified embodiment of the invention is represented. Compared to the variant of FIGS. 1 and 2, a modified valve 11 is represented here, which, besides the connection for a medium supply 8 also presents a connection for a medium recycling line 8'.

The actuation element 10 is designed here as a pusher, which, depending on the position of the weight body 12 connected to it, closes or opens the medium recycling line 8'. The valve 11 is designed here in such a way that the medium used cannot exit at any time into the area between the base body 3 and the weight body 12. In the standard intended operation, the actuation element 10 closes the medium recycling line against the unwanted drawing off of medium.

Analogously to the above-described system breakdown, a pressure drop in the medium supply again leads to a pressure reduction in the chambers 6, resulting in a clamping force being applied to the component 2.

Figure 4:
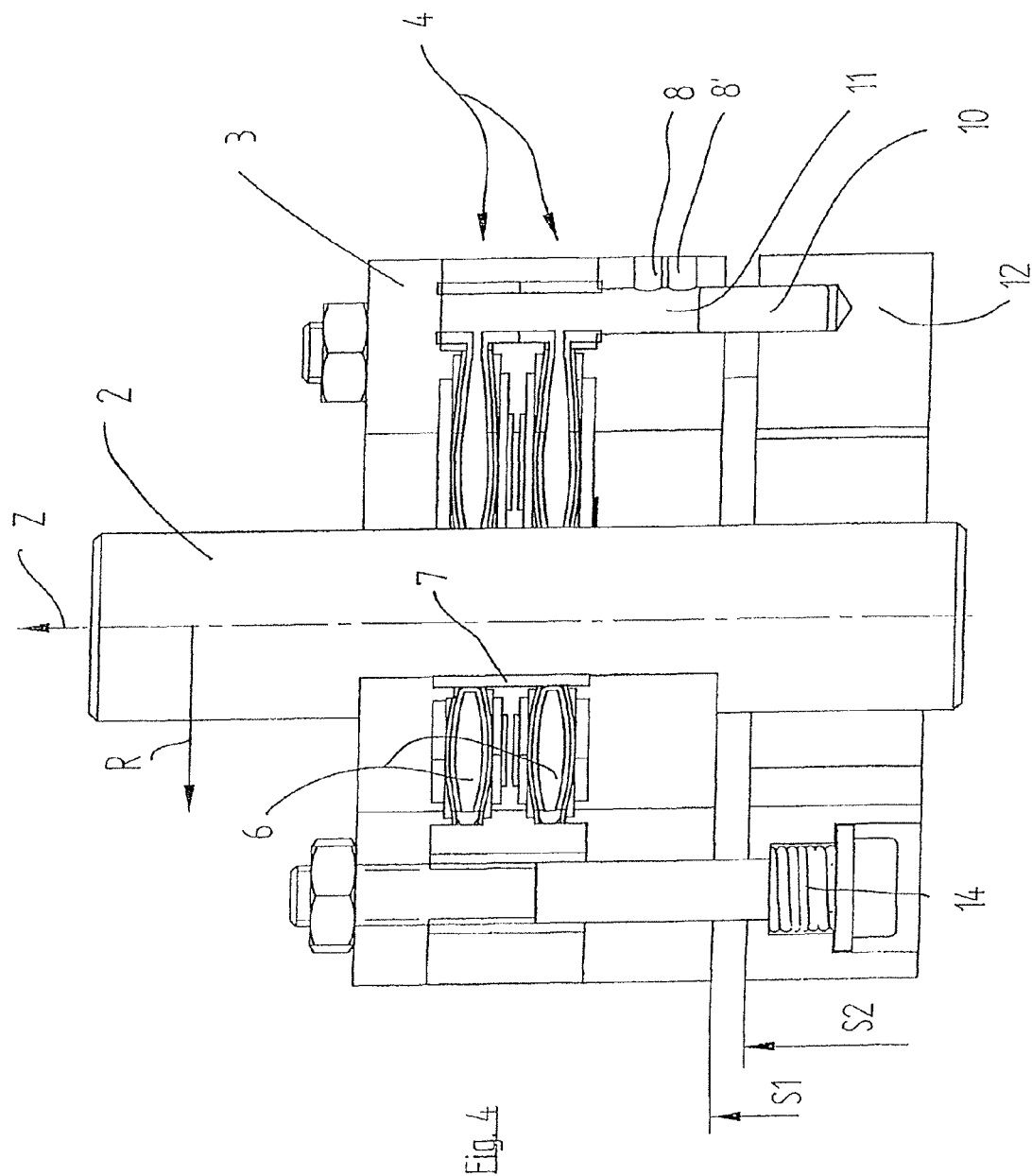
FIG. 4 shows the same embodiment as in FIG. 3 in a position with an opened valve.

The weight body 12, which is again suspended against a spring 14 on the base body 3, drops to an allowable extent from the position S1 into the position S2, as represented in FIG. 4. In the process, the actuation element 10 opens the medium recycling line 8', so that the pressure that may have been reestablished in the medium supply is released through the medium recycling line 8', without being applied to the chambers 6 of the clamping systems 4. In particular when hydraulic oil is used, the supplied oil is thus reliably recycled through the medium recycling line 8'.

The pressure medium made available in this manner, however, can again apply pressure to the chambers 6, and thus release the clamping against the components 2, only if the actuation element 10 again closes the medium recycling line 8'. For this purpose, the lifting device—not shown—must again lift the weight body 12 from the position S2 into the position S1, to close the valve 11 in this direction. It is only now that the packet consisting of the base body 3 and the weight body 12 can again be moved as desired.

Figure 5:
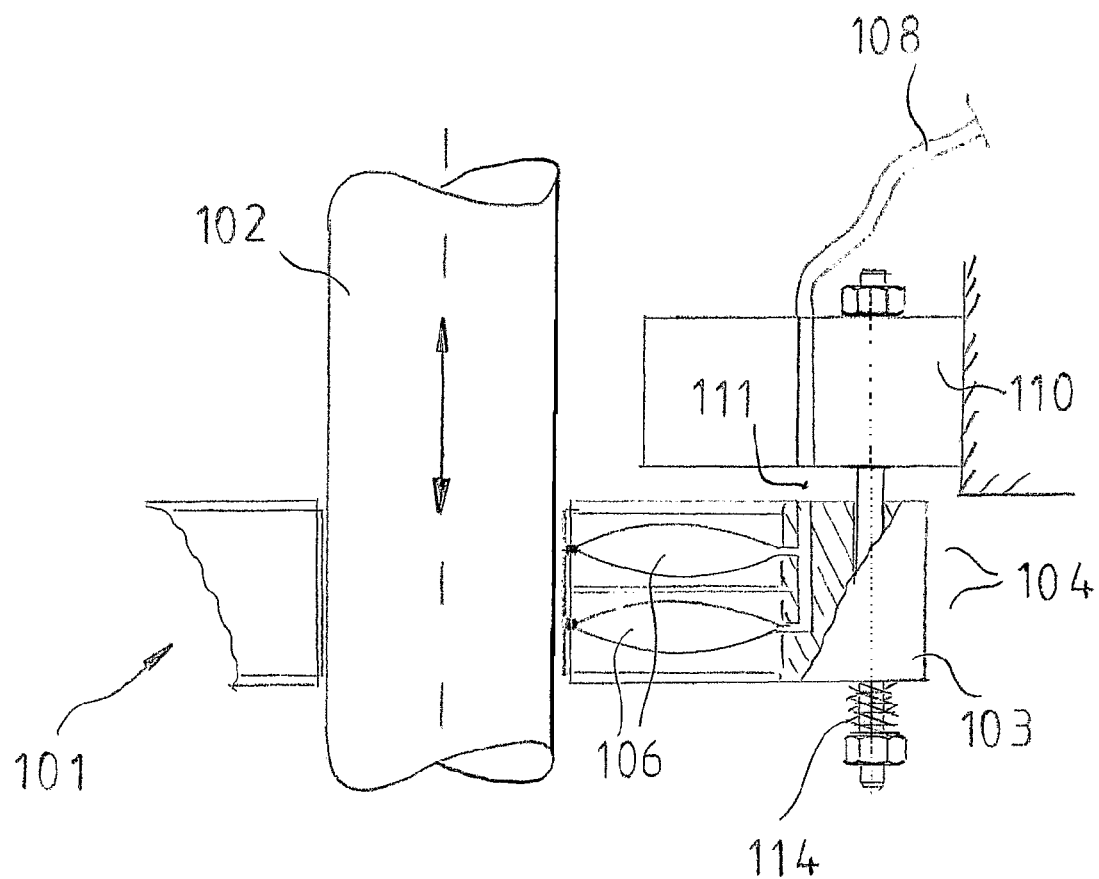
FIG. 5 shows a cross-section view of an embodiment with a reversed principle of action.

In FIG. 5, a safety device 101 operating according to the reversed functioning principle is shown. Because of symmetry, essentially only the right part of the safety device is represented.

In that figure, a rod 102 is represented, which can be moved in the vertical direction and which traverses a base body 103. The joint action of the rod 102 and of the base body 103 corresponds to the previous embodiments. In particular, the base body 103 again presents clamp elements 104, which are suitable for applying a clamping force to the rod 102.

The base body 103 is attached below a fixed actuation element 110, which is mounted by means of a screw-shaped abutment, which is prestressed by a spring 114. The actuation element 110 here presents a part of the medium supply 108, which is guided to the base body from above the base body 103. The valve function proper is ensured by the very simply designed valve 111.

This safety device functions as follows:

During normal operation (not shown here), the base body 103 abuts with its top surface against the actuation element 110 so that there is a continuous enclosed connection of the medium supply 108 up to the chambers 106. The chambers 106 therefore are inflated so that they cannot exert any clamping action on the rod 102, so that the latter can move freely up and down relative to the base body 103 and the actuation element 110, particularly in the vertical direction.

In case of a sudden pressure drop in the medium supply 108 (this case is represented in FIG. 5), the clamp elements 104 extend because of the falling pressure, resulting in a clamping action with the rod 102. Due to the operational failure, the rod 102 (optionally with weights or other components attached to it) moves downward in the vertical direction due to gravity, resulting also in movement some distance downward of the base body 103 clamped to it. As a result, the valve 111 opens in such a manner that medium can no longer reach the clamp elements 104 from the medium supply 108 (which in addition at this time has undergone a pressure reduction). The abutment represented by the screw stops the downward movement of the base body 103 and the rod 102 attached to the base body so that, if there is no medium, undesired movements are no longer possible.

At the time of a new startup of operation, or when medium is made available through the medium supply 108, the clamping action of the base body 103 to the rod 102 persists as long as the valve 111, or the slit located there between the base body 103 and the actuation element 110, is not closed. However, if the rod 102 is lifted so that this slit is closed, then the medium reaches the clamp elements 104 again, resulting in the release of the clamping, so that the rod 102 can now slide completely freely up and down.

The spring 114 ensures that the base body 103 does not slide downward due to its own weight (that is without clamping to the rod 102), thus causing an undesired clamping.

It is now noted that the medium supply 108 can be led directly into the base body 103, instead of through the actuation element 110. The only important factor is that, in the case of a relative movement between the base body 103 and the actuation element 110, a part of the medium supply line is opened to the environment, so that the pressure can escape from the clamp elements 104.

Figure 6:
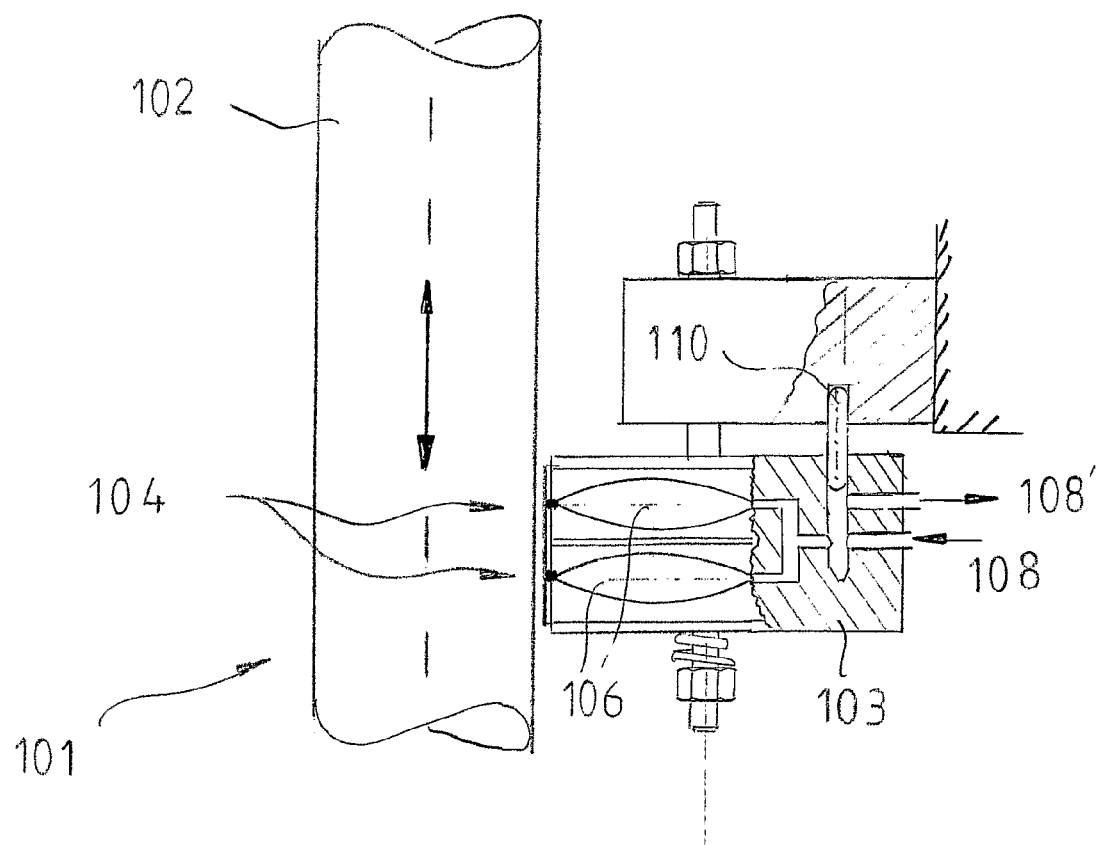
FIG. 6 shows a cross-section view of a modified embodiment of the reversed operation principle.

In FIG. 6, a modified form of the variant according to FIG. 5 is represented. The fixed actuation element 110 is here formed substantially by a pin, which is mounted on the based body 103 from above and extends into a section of the medium line in the base body 103. Analogously to the mechanism of action of the devices in FIGS. 3 and 4, the medium is led here out of a medium supply 108 into a medium recycling line 108', as long as the actuation element 110 does not close this medium recycling line. It is only when the base body 103 and the fixed component with the actuation element 110, which is located in a fixed position above the base body, move toward each other that this element closes the medium recycling line again, so that pressure can again be applied to the chambers 106 by the medium applied through the medium supply 108 in such a manner that a clamping against the rod 102 is released.

As used herein, whether in the above description or the following claims, the terms "comprising," "including," "carrying," "having," "containing," "involving," and the like are to be understood to be open-ended, that is, to mean including but not limited to. Only the transitional phrases "consisting of" and "consisting essentially of," respectively, shall be considered exclusionary transitional phrases, as set forth, with respect to claims, in the United States Patent Office Manual of Patent Examining Procedures (Eighth Edition, August 2001 as revised October 2005), Section 2111.03.

Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A safety device for the detachable clamping of elements, the safety device comprising:
  (a) a base body adapted to be traversed by a component extending in an axial direction, the base body being mounted with respect to the component so as to facilitate relative movement between the base body and the component in the axial direction;
  (b) the base body comprising at least one clamp element, the at least one clamp element including at least one chamber into which a medium can be admitted through a medium supply to produce an elastic change of the respective chamber dimensions in a direction radial to the axial direction, the medium supply comprising a valve which can be actuated via an actuation element that is mounted on the base body so as to facilitate relative movement between the base body and the actuation element in the axial direction, such relative movement between the actuation element and the base body moving the valve between a closed condition in which medium is admitted into the at least one chamber and an open condition in which medium is released from the at least one chamber;
  (c) wherein a section of the at least one chamber, or an element coupled to the at least one chamber, forms a respective force transmission element to transmit a clamping force on the component; and
  (d) wherein when medium is admitted into the at least one chamber to produce an elastic change of its dimensions in a direction radial to the axial direction, the respective force transmission element clamps or releases the component in the direction radial to the axial direction.

2. The safety device of claim 1, wherein the actuation element is part of a weight body that is guided in the axial direction.

3. The safety device of claim 2, wherein the weight body is arranged adjacent to the base body in the axial direction, and wherein the weight body is connected with the base body in a manner so it can be shifted in the axial direction with respect to the base body.

4. The safety device of claim 3, wherein the weight body can be moved relative to the base body from a first position in which the valve is in the closed condition into a second position in which the valve is moved to the open condition.

5. The safety device of claim 4, wherein the weight body is pressed by a force spring in the axial direction against the base body.

6. The safety device of claim 5, wherein the weight body, during a movement against the force spring, moves the valve to the open condition via the actuation element.

7. The safety device of claim 1, wherein, when the valve is in the open condition, the at least one clamp element clamps the base body relative to the component.

8. The safety device of claim 1, wherein the valve is adapted to be moved to the closed condition by the movement of a weight body against the base body, to release the clamping of the component against the base body.

9. A safety device for the detachable clamping of elements, the safety device comprising:
   (a) a base body, which is adapted to be penetrated by a component extending in an axial direction in such a manner that the base body and the component are two elements at least one of which is movable with respect to the other;
   (b) the base body including at least one clamp element, the at least one clamp element including at least one chamber into which a medium can be admitted through a medium supply line, the medium supply line including a valve which can be actuated via an actuation element that is mounted on the base body so as to facilitate relative movement between the base body and the actuation element in the axial direction, such relative movement between the actuation element and the base body moving the valve between a closed condition in which medium is admitted into the at least one chamber and an open condition in which medium is released from the at least one chamber;
   (c) wherein a section of the at least one chamber, or an element coupled to the at least one chamber, forms a respective force transmission element to transmit a clamping force on the component; and
   (d) wherein when medium is admitted into the at least one chamber, the respective force transmission element clamps or releases the component in a direction radial to the axial direction.

10. The safety device of claim 9, wherein the actuation element is a part of a structure substantially fixed relative to the component.

11. The safety device of claim 10, wherein the actuation element is arranged adjacent to the base body in the axial direction.

12. The safety device of claim 11, wherein the base body can be moved relative to the actuation element from a first position in which the valve is in the closed condition into a second position in which the valve is in the open condition.

13. The safety device of claim 12, wherein the base body is constructed to be pressed by a spring force in the axial direction against the actuation element.

14. The safety device of claim 13, wherein the base body moves the valve to the open condition as the base body moves away from the actuation element.

15. The safety device of claim 9, wherein the at least one clamp element clamps the base body relative to the component when the valve is in the open condition.

16. The safety device of claim 9, wherein the valve is adapted to move to the closed condition to release the clamping of the component against the base body as a result of (a) movement of a weight body against the base body, or (b) movement of the base body against the actuation element.

17. The safety device of claim 9, wherein the valve in the open condition is adapted to release the medium from the medium supply line to the environment or to a medium recycling line.

18. The safety device of claim 9, wherein the at least one clamp element is an annular membrane surrounding the component.

19. The safety device of claim 9, wherein the at least one clamp element is substantially made of metal.

20. The safety device of claim 9, wherein the at least one chamber further comprises top and bottom curved walls, which are adapted to partially flatten in response to a reduction of medium pressure in the at least one chamber.

* * * * *